United States Patent [19]

Oswald

[11] Patent Number: 4,697,190
[45] Date of Patent: Sep. 29, 1987

[54] BOREHOLE LOCATED DIRECTIONAL ANTENNAE MEANS FOR ELECTROMAGNETIC SENSING SYSTEMS

[75] Inventor: Gordon K. A. Oswald, Huntingdon, England

[73] Assignee: Coal Industry (Patents) Limited, London, England

[21] Appl. No.: 778,915

[22] Filed: Sep. 23, 1985

[30] Foreign Application Priority Data

Nov. 2, 1984 [GB] United Kingdom ............... 8427792

[51] Int. Cl.$^4$ ........................... H01Q 1/04; H01Q 9/20
[52] U.S. Cl. .................................... 343/719; 343/789; 324/338
[58] Field of Search ............... 343/719, 808, 789, 860, 343/872, 739, 740; 324/333, 337, 338

[56] References Cited

U.S. PATENT DOCUMENTS

| 4,511,843 | 4/1985 | Thoraval | 324/338 |
| 4,577,153 | 3/1986 | Stolarczyk | 324/338 X |

OTHER PUBLICATIONS

Lytle et al., "Design of a Miniature ... Boreholes", IEEE Trans. on Geoscience Electronics, vol. GE-16, No. 4, Oct. 1978, pp. 304–307.

Primary Examiner—Eugene R. LaRoche
Assistant Examiner—Seung Ham
Attorney, Agent, or Firm—James C. Wray

[57] ABSTRACT

A directional antenna for an electromagnetic sensing system comprises a generally cylindrical tube of electrically-conductive material a portion of the tube being cut away to define a transversally-facing window. The non-cut away portion of the tube provides a backing shield for a pair of antenna elements mounted on a generally 'V'-shaped support. A cover of dielectric material is arranged over the antenna elements.

12 Claims, 5 Drawing Figures

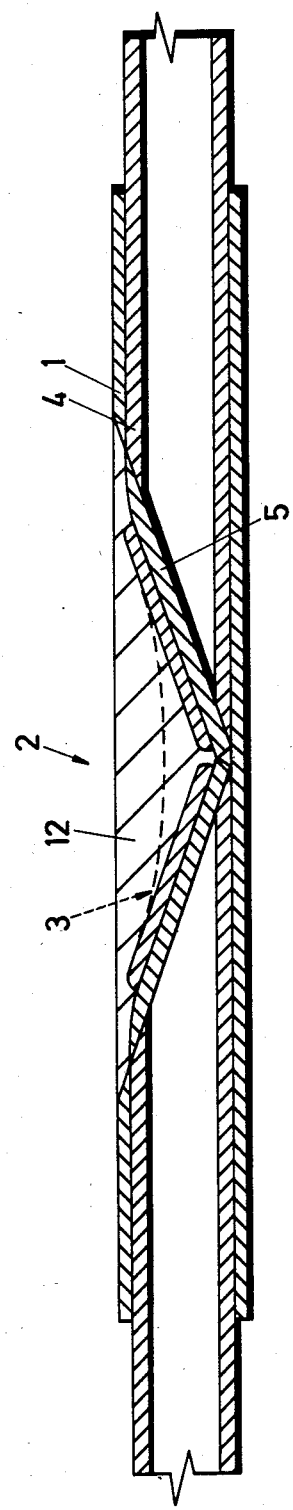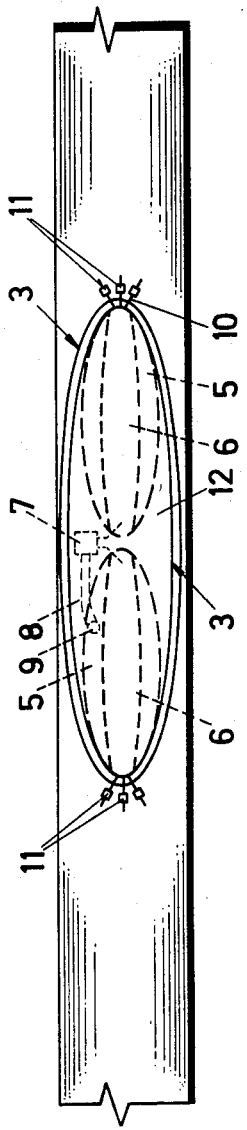

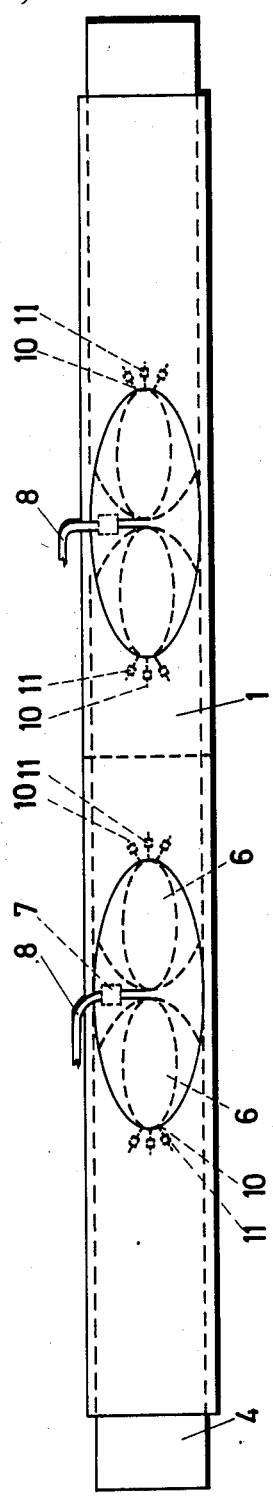

4,697,190

BOREHOLE LOCATED DIRECTIONAL ANTENNAE MEANS FOR ELECTROMAGNETIC SENSING SYSTEMS

This invention relates to borehole located directional antennae for electromagnetic sensing systems. In particular, although not exclusively, the invention relates to a directional antennae for location in generally horizontal boreholes extending within layers of strata, as for example coal seams, the sensing system being used to determine distances of strata boundaries from the boreholes.

An object of the present invention is to provide a reliable and robust directional antenna which is suited to borehole application in an electromagnetic sensing system.

According to one aspect, of the present invention a directional antenna for locating in a borehole and adapted to form a component of an electromagnetic sensing system, comprises a generally cylindrical tube of electrically conductive material, a portion of the circumference of the tube being cut away to define a window, the none cut away portion of the circumference of the tube providing a backing shield for the window, a generally 'V' shaped support of electrically insulating material located in the tube adjacent to the window with the central base portion of the 'V' shape adjacent to the none cut away backing shield, a pair of antenna elements mounted on, and extending along, the inclined limbs of the generally 'V' shaped support, respectively, and a protective cover arranged over the antenna elements.

Preferably, the cover is a dielectric material.

Conveniently, the two antenna elements are connected to feed lines, via a matching transformer.

Preferably, each antenna element is electrically connected to the tube via electrically resistive loaded means.

Conveniently, the resistive loaded means comprises a number of auxiliary leads arranged in parallel, a resistance being provided in each lead.

Preferably, each antenna element is generally of elongate elliptical or petal shape.

Each end of the tube may be provided with further resistive loading means.

Preferably, the further resistive loaded means is constituted by having the tube made of electrically resistive material.

Alternatively, resistive loads are connected between lengths of tube components constituting the tube.

According to a second aspect of the present invention a borehole probe for an electromagnetic sensing system comprises a transmitting antenna and a receiving antenna, each antenna comprising a generally cylindrical tube of electrically conductive material, a portion of the circumference of the tube being cut away to define a window, the none cut away portion of the circumference of the tube providing a backing shield for the window, a generally 'V' shaped support of electrically insulating material located in the tube adjacent to the window with the central base portion of the 'V' shape adjacent to the none cut away backing shield, a pair of antenna elements mounted on, and extending along, the inclined limbs of the generally 'V' shaped support, respectively, and a cover arranged over the antenna elements.

Preferably, the transmitting antenna is fed with a signal pulse such that, in use, radiation energy is emitted through the window in a direction transverse to the axis of the borehole probe.

Conveniently, the receiving antenna is axially spaced from the transmitting antenna to receive radiation beams reflected from a boundary of the layer of strata containing the borehole.

By way of example, one embodiment of the present invention is described herein with reference to the accompanying drawings, in which:

FIG. 1 is a longitudinal section of the antenna of FIG. 1;

FIG. 3 is a plan of the antenna of FIG. 1;

FIG. 4 is a plan of a borehole probe comprising two directional antenna constructed according to the present invention.

Figure 1:
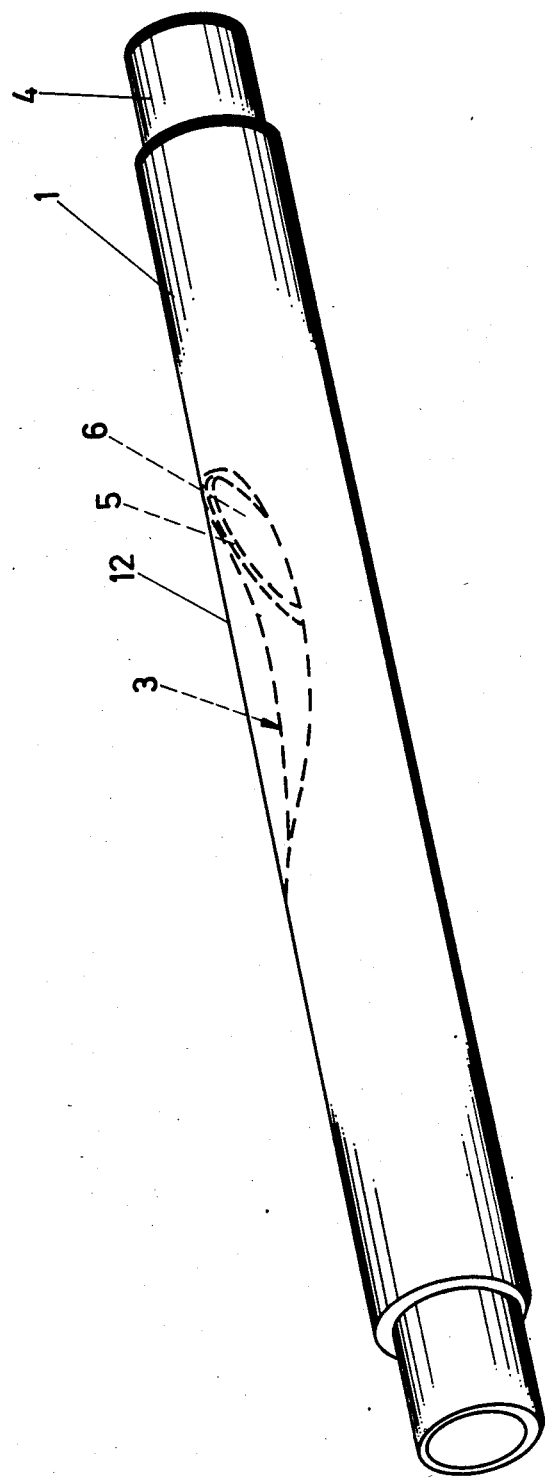
FIG. 1 is an incomplete perspective view of a directional antenna constructed according to the present invention.

FIGS. 1 to 3 of the drawings show details of a directional antenna for locating in a generally horizontal borehole in a coal seam and forming part of an electromagnetic sensing system for determining the distance of the upper or lower seam boundary from the borehole. As will be explained later in the specification the directional anetnna is suitable for use as a transmitting or receiving antenna.

The antenna comprises an outer, generally cylindrical tube 1 of electrically conductive material as for example steel or copper, a portion of the circumference of the tube being cut away to define a window 2. The extent of the cut away portion is indicated by reference number 3. The none cut away portion of the tube provides a backing shield for the window.

A second tube 4 of electrically insulating material as for example, plastics material, is fixedly mounted inside the first tube 1, the tube 4 being cut away in the region of the window 2 to define two inclined mounting rims upon each of which is fixedly mounted one limb of a generally 'V' shaped support 5 also of electrically insulating material. Each limb of the support is eliptical corresponding to the profile of the inclined rim of the cut away tube. The generally 'V' shaped support is located adjacent to the window with the central base portion of the 'V' shape nearest to the none cut away backing shield.

A pair of antenna elements 6 are mounted on, and extend along, the inclined limbs of the generally 'V' shaped support respectively. For example, the elements 6 and support are formed by etched laminated copper board with a generally elliptical outline over the end of the tube 4. The angle of the 'V' shape is such that the combined axial length of the elements forms a half-wavelength at the frequency at which it is desired to have maximum radiated energy. The two elements are electrically interconnected by a matching transformer 7 having a feed cable 8 which passes through a hole 9 provided in one limb of the support 5. In addition, the two elements are electrically connected to the tube 1 by a number of grounding leads 10 arranged in parallel and each provided with a resistance 11. The grounding leads provide a resistive loading to dissipate energy which is not radiated from the antenna elements, the leads allowing a DC return path. The 'grounding' leads providing the resistive loading to dissipate energy and, thereby, tend to reduce reflection of energy. By shaping the antenna elements 6 in the form of elongate elliptical and petal shapes the antenna impedance is controlled to achieve substantially constant impedance with minimal reflection amplitude.

Energy is shared between the terminating loads and the radiated field with the ratio being gradually frequency dependent. In general, higher frequencies are radiated preferentially.

The window cavity is filled with a plug 12 of suitable dielectric material having a dielectric constant tending to match that of the strata surrounding the borehole which tends to reduce the impedance of the antenna, thereby increasing the radiated energy and which provides a protective covering over the antenna elements, the plug 12 substantially filling the cut away portion of the tube 1. The plug also serves to reduce the reflection at the dielectric boundary formed by the walls of the borehole. Typically, for a borehole in coal the dielectric constant of the cover material is within the range 4 to 9.

Such an antenna arrangement exhibits a wide bandwidth, and low reflection at low frequencies. Also the arrangement provides for a high front-to-back ratio, maximum radiation energy being directed through the window in a direction transverse to the axis of the tube 1. The high front-to-back ratio is achieved by the arrangement or geometry of the antenna elements and the screening effect of the backing shield provided by the none cut away portion of the grounded tube 1. Typically, the front-to-back ratio of the antenna arrangement is approximately 20 db to 30 db and to operate over a 3 db hand width from 50 to 500 Mega Hertz.

As the live antenna elements 6 are located closely adjacent to the 'grounded' tube 1, each element forms a transmission line arrangement with the tube which in effect constitutes a third conductor. Consequently, radiation is emitted by each element 6 and the adjacent portion of the tube, the radiation being directed in a direction along the tube and away from the antenna. Problems associated with this axial radiation may arise due to the energy being reflected from the ends of the tube and thereby directed back along the tube. As will be explained later in this specification reflected energy would interfere with signals received by the receiver antenna which could mask or distort any useful received signal.

With present day drilling techniques it might not be practical to use a tube of such a long length (for example a tube length of over three metres) that the end reflected signals would arrive after a longer delay than those signals reflected from real targets, or that the end reflected signals would have been sufficiently damped in the external attenuating strata medium so as to be insignificant. However, in some instances it is possible that this length may be increased by additional drill rods.

Alternatively, it is proposed to use a relatively short tube having its ends resistively tapered to attenuate and minimize the amplitude of reflection.

In the same way as the antenna elements 6 are resistive loaded to minimize reflections from the ends of the elements, the tube ends can be subjected to the entry absorbing technique. The principle of resistibe loading or resistive tapering can be implemented either by lumped resistive loads connected between short lengths of the tube or by using resistive materials as the conductor itself. The tube then would be given a stepped or continuously graded specific resistance as a formation of its length. For example, in one embodiment of resistive loading cylinders of resistive plastics material are added to the ends of the tube 1.

Referring now to FIG. 4 which shows a plan of a borehole probe comprising two directional antenna constructed according to the present invention. In order to isolate the feed cables 8 from the live antenna conductors the cables are placed into grooves or bores extending along the outside of the tube 1. For the sake of clarity, in FIG. 4 the feed cables are shown outside the tube and the inset grooves are not shown. As the grooves are inset into the tube 1, the feed cables do not protrude beyond the outer circumference of the tube and, therefore, are protected from damage.

The two directional antennae are arranged as an end to end pair, one is used for transmission and the other for reception. As explained previously each antenna provides directionality in its radiated or received beam, the front-to-back ratio typically being in the range 20 db to 30 db. The antenna design therefore, lends itself to discriminating between targets in different planes about the borehole axis. In particular the probe is suitable for sensing upper and lower seam boundaries. In the embodiment shown in FIG. 4 the two different boundaries are sensed at different times and by rotating the single transmitter/receiver pair at about 180°. In other embodiments a plurality of receiver antennae are provided on the probe, the receiver antennae being angularly spaced around the axis of the tubular probe.

In operation, the transmitter antenna is fed with a signal pulse such that radiation energy is emitted through the window in a direction transverse to the axis of the borehole probe. Upon the emitted beam reaching a seam boundary a portion is reflected back towards the probe, the reflected beam being sensed by the receiver antenna. Thus, by sensing the time taken for the beam to travel to and from the boundary it is possible to determine the distance of the boundary from the borehole. The probe then is rotated through 180° and the operation repeated. By adding the two sensed distances together the seam thickness in the vicinity of the probe is derived.

In other installations, the probe is used to sense more than one strata boundary on the same side of the borehole. In such installations more than one reflected beam is sensed.

Figure 5:
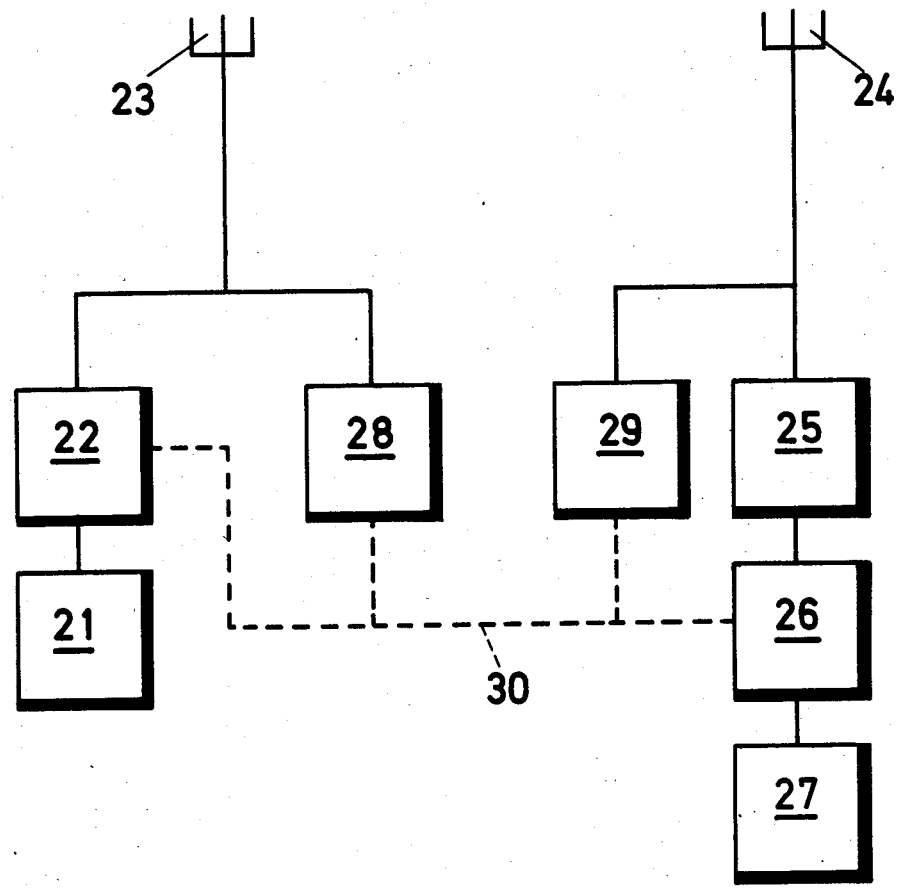
FIG. 5 is a block electrical circuit diagram of an electromagnetic sensing system comprising a borehole probe as illustrated in FIG. 4.

Referring not to FIG. 5, a power supply 21 feed power to a radio frequency generator 22 which feeds an R.F. signal pulse to the feed point of the transmitting antenna 23 which is one of the pair of antenna of the borehole located probe shown in FIG. 4. The supply is fed to the pair of antenna elements via the associated matching transformer. A portion of the radiated radio frequency signal emitted from the transmitter antenna elements into the coal seam is reflected back at the boundary of the seam being sensed and is picked up by the receiver antenna 24. The received signal is monitored and digitised by sampler 25 and the digital data then is analysed and processed into a useful form by data analysis device 26 which feeds the data in the required form to output device 27 which may be a visual display unit, printer etc. The data analysis device 26 also controls via control liners 30 (shown dotted) the radio frequency generator 22 and the rotational orientation of both antenna 23 and 24 via rotational control devices 28 and 29.

Various electronic devices may be located within the support tube 4 of the antenna to provide a simplified and compact unit. This would simplify the input and output of signals to and from the antenna tube assembly.

In another embodiment the transmitter antenna elements are fed with a continuous signal.

In other embodiments of the invention, two probes are provided. one probe comprising a transmitter antenna and the other probe comprising an emitter antenna. Such embodiments are used to sense strata between two boreholes containing the probes, respectively.

I claim:

1. A directional antenna for locating in a borehole formed in strata, and adapted to form a component of an electromagnetic sensing system, comprising a generally cylindrical tube of electrically conductive material, a portion of the circumference of the tube cut away to define a window, the none cut away portion of the circumference of the tube providing a backing shield for the window, a generally 'V' shaped support of electrically insulating material located in the tube adjacent to the window with the central base portion of the 'V' shape adjacent to the none cut away backing shield, a pair of antenna elements mounted on, and extending along, the inclined limbs of the generally 'V' shaped support, respectively, and a cover arranged over the antenna elements.

2. An Antenna as claimed in claim 1, in which the cover is a dielectric material.

3. An antenna as claimed in claim 2, in which the two antenna elements are connected to feed lines via a matching transformer.

4. An antenna as claimed in claim 3, in which each antenna element is electrically connected to the tube via electrically resistive loaded means.

5. An antenna as claimed in claim 4, in which the resistive loaded means comprises a number of auxiliary leads arranged in parallel, as resistance being provided in each lead.

6. An antenna as claimed in claim 5, in which each antenna element is generally of elongate elliptical or petal shape.

7. An antenna as claimed in claim 6, in which each end of the tube is provided with further resistive loading means.

8. An antenna as claimed in claim 7, in which the further resistive loaded means is constituted by having the tube made of electrically resistive material.

9. An antenna as claimed in claim 7, in which resistive loads are connected between lengths of tube components constituting the tube.

10. A borehole probe for an electromagnetic sensing system comprising a transmitting antenna and a receiving antenna, each antenna comprising a generally cylindrical tube of a electrically conductive material, a portion of the circumference of the tube being cut away to define a window, the none cut away portion of the circumference of the tube providing a backing shield for the window, a generally 'V' shaped support of electrically insulating material located in the tube adjacent to the window with the central base portion of the 'V' shape adjacent to the none cut away backing shield, a pair of antenna elements mounted on, and extending along, the inclined limbs of the generally 'V' shaped support, respectively, and a protective cover arranged over the antenna elements.

11. A probe as claimed in claim 10, in which the transmitting antenna is fed with a signal pulse such that, in use, radiation energy is emitted through the window in a direction transverse to the axis of the borehole probe.

12. A probe as claimed in claim 11, in which the receiving antenna is axially spaced from the transmitting antenna to receive radiation beams reflected from a boundary of the layer of strata containing the borehole.

* * * * *